United States Patent
Zettler (10) Patent No.: US 7,048,182 B2
(45) Date of Patent: May 23, 2006

(54) METHOD AND APPARATUS FOR PROVIDING A CARD CARRIER FOR BRINGING TOGETHER WITH A CARD

(75) Inventor: Hubert Zettler, Augsburg (DE)

(73) Assignee: Boewe Systec Ag, Augsburg (DE)

( * ) Notice: Subject to any disclaimer, the term of this patent is extended or adjusted under 35 U.S.C. 154(b) by 0 days.

(21) Appl. No.: 11/059,870

(22) Filed: Feb. 16, 2005

(65) Prior Publication Data

US 2005/0139653 A1    Jun. 30, 2005

Related U.S. Application Data

(63) Continuation of application No. PCT/EP03/12008, filed on Oct. 29, 2003.

(30) Foreign Application Priority Data

Oct. 30, 2002    (DE) ................................ 102 50 653

(51) Int. Cl.
*G06K 5/00*    (2006.01)

(52) U.S. Cl. ...................................... 235/380; 235/487
(58) Field of Classification Search ................ 235/380, 235/487

See application file for complete search history.

(56) References Cited

U.S. PATENT DOCUMENTS

| | | | |
|---|---|---|---|
| 4,034,210 A * | 7/1977 | Hill et al. ................... 235/487 |
| 5,027,587 A * | 7/1991 | Ramsey ....................... 53/493 |
| 5,388,815 A * | 2/1995 | Hill et al. ..................... 270/32 |
| 5,433,364 A * | 7/1995 | Hill et al. ..................... 225/96 |
| 5,715,653 A * | 2/1998 | Weinmann et al. ........... 53/411 |
| 5,799,316 A | 8/1998 | Audren |
| 6,294,032 B1 * | 9/2001 | Weinmann et al. ........... 156/64 |
| 6,431,453 B1 * | 8/2002 | Hill et al. ................... 235/475 |
| 6,447,625 B1 * | 9/2002 | Schmid et al. ................ 156/64 |
| 6,467,687 B1 * | 10/2002 | Hill et al. ................... 235/448 |
| 6,629,006 B1 * | 9/2003 | Weinmann .................. 700/100 |
| 6,719,198 B1 * | 4/2004 | Bretl et al. ................. 235/380 |
| 2005/0082363 A1 * | 4/2005 | Eichler et al. ............. 235/380 |

FOREIGN PATENT DOCUMENTS

CA           2212436           5/2000

* cited by examiner

*Primary Examiner*—Karl D. Frech
*Assistant Examiner*—Daniel Walsh
(74) *Attorney, Agent, or Firm*—Michael A. Glenn; Glenn Patent Group (57) ABSTRACT

In a method and an apparatus for providing a card carrier for bringing it together with a card, the card is initially provided, and card data are acquired from it. On the basis of this card data, a card-carrier blank having a first identification mark is provided. On the basis of the card data, predetermined data and a second identification mark associated with the predetermined data are printed onto the card-carrier blank so as to form the card carrier. Subsequently, the first and the second identification marks are acquired by the card carrier to determine whether the data applied and the blank belong together. If it is determined that the data and the card-carrier blank belong together, the card carrier is provided for bringing it together with the card.

23 Claims, 4 Drawing Sheets

METHOD AND APPARATUS FOR PROVIDING A CARD CARRIER FOR BRINGING TOGETHER WITH A CARD

CROSS-REFERENCE TO RELATED APPLICATION

This application is a continuation of copending International Application No. PCT/EP200/012008, filed Oct. 29, 2003, which designated Japan and the United States and was not published in English.

BACKGROUND OF THE INVENTION

1. Field of the Invention

The present invention relates to a method and an apparatus for handling cards, and here specifically to a method and an apparatus for providing a card carrier for combining, or bringing together, with such a card, in particular a plastic card.

2. Description of Prior Art

Known systems for handling plastic cards operate such that the plastic cards, e.g. thick plastic cards of the CR-80 type, are automatically joined with (applied to) card carriers in variable numbers of items. The card carriers provided with plastic cards are subsequently packed into envelopes at an enveloping station or are folded and sealed and subsequently supplied to further processing. In addition, the card carriers may be associated with any supplements which are then jointly enveloped or folded. The prior art has known various methods and apparatus for applying plastic cards and card carriers. Methods and apparatus for bringing together and joining plastic cards and card carriers using a print job number have been known from DE 195 08 282 C1 and DE 195 33 444 A1. According to these documents, after the step of bringing together and joining, the plastic carriers are inserted into envelopes and supplied to further processing. A similar method, wherein the bringing together and joining of plastic cards and card carriers is verified using a checksum has been known from DE 197 25 579 A1. A method and apparatus for bringing together and joining plastic cards and card carriers using a job number, the processing being effected off-line, has been known from DE 197 34 483 A1. The above-mentioned known methods are about joining card carriers and plastic cards, the plastic cards having a magnetic strip or another memory unit that may be read out by a reader, so as to store specific data of the plastic card or specific data of a holder of the plastic card.

In all of the above-described apparatus and methods, a prepared card-carrier blank, or pre-printed form, is provided which will then be filled, either off-line or on-line, with the data required, e.g. an address or the text of the letter, whereby the card-carrier blank becomes the card carrier.

The procedure underlying the above-described known methods will be described in more detail below by means of an on-line system using the diagrammatic representation of a conventional apparatus in FIG. 4.

Figure 4:
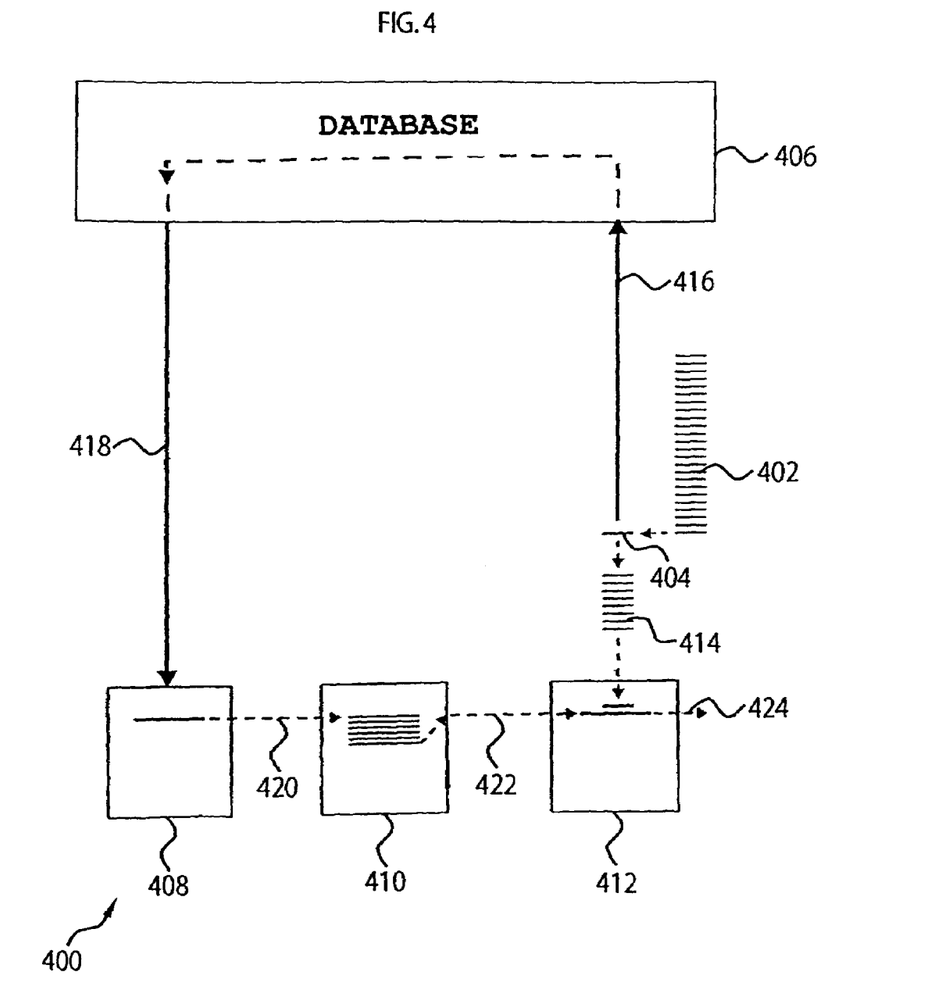
FIG. 4 is a diagrammatic representation of a conventional apparatus for providing card carriers.

The conventional system diagrammatically shown in FIG. 4 has, in its entirety, been given reference numeral 400. System 400 includes a card hopper 402 holding one or several plastic cards. A reader 404 successively receives the plastic cards (not shown in FIG. 4) from card hopper 402 and reads out card data stored in the memory element of the plastic card, e.g. in the magnetic strip or in another chip. System 400 further includes a data-processor 406, e.g. in the form of a computer, which also contains a database. In addition, system 400 includes a printer 408 creating the card carriers for the plastic cards. The printed card carriers are provided to an applicator 412 via a card-carrier buffer 410. The applicator 412 further receives the plastic cards to be applied from a card buffer 414 and outputs them to other handling stations of the system (not shown in FIG. 4) for further processing.

The mode of operation of the system shown in FIG. 4 is such that the card data read out by the reader 404 are output to the data-processor 406, as is indicated by arrow 416. In the data-processor 406, the database is accessed utilizing the card data received, so as to read out the print data required for producing the card carrier. These read-out print data are then provided to printer 408, as is indicated by arrow 418. Printer 408 receives the print data and produces the card carrier associated with the plastic card.

As the starting material, printer 408 receives card-carrier blanks already containing, e.g., the letterhead and additional, unvarying information about the issuer of the plastic card. If card-carrier blanks are received, the text required for personalizing the card-carrier blank, e.g. the address and the letter text, is printed in printer 408 on the basis of the data received from the database. The card carriers thus produced are then provided to buffer 410, as is indicated by arrow 420. In addition to the text information, an identification mark identifying the card carrier is also printed onto the blank in printer 408, this identification mark enabling subsequent matching in the applicator 412.

The card carriers are provided from buffer 410 to applicator 412, as is indicated by arrow 422. Prior to joining card carrier and plastic card, another reading operation is performed in the applicator 412 by reading out, from the card carrier provided, the identification mark printed there, and by comparing it with the card data of a plastic card to be joined with the applicator, the comparison being effected in processor 406. If a match between the identification mark and the card data is ascertained, i.e. if a determination is made that the card carrier and the plastic card belong together, the applicator 412 is controlled to join the card carrier and the plastic card and to subject them to further processing in the system, as is indicated by arrow 424. If a determination is made that the plastic card and the card carrier do not match, both the plastic card and the card carrier are discarded from system 400.

The plastic cards mentioned in FIG. 4 are plastic cards which are sent by mail and include credit cards, medical insurance cards, driving licenses and identity cards, loyalty cards, such as Miles & More etc. The known system described in FIG. 4 prepares the plastic cards for shipment, this being done either by the respective issuers of the cards themselves or by respective service companies having been given corresponding instructions by the issuers of the cards.

The on-line system described in FIG. 4 is supplied with plastic cards which have been personalized and encoded in advance. The information required is also stored in a database.

The card-carrier blank stacks are applied to the card shipment system 400, and the system is started. While each card is read, the printing of the card carrier belonging to the card is triggered. In the subsequent processing, a check is made, as described above, on the basis of the identification mark and the card data of the plastic card, as to whether the card carrier and the card belong together. Subsequently, the card is fixed onto the card carrier in applicator 412. Then the card carrier with the card may be folded and inserted into an envelope along with supplements.

Rather than applying only one card, it is also possible to apply several cards to one card carrier.

A conventional system operating on-line has been described with regard to FIG. 4. This means that the printer is disposed within the system and produces the card carriers while the plastic cards are being processed. Alternatively, there are also off-line systems wherein the printer is not integrated into the system. Here, the card carrier, the letter and the cards are personalized and encoded independently of one another. The information required is taken from a database. Subsequently, the two stacks, i.e. the personalized card carriers and the plastic cards, are positioned and processed in the order of personalization in the card shipment system 400. Here, too, a check is performed as to whether the card carrier and the card belong together, with cards and card carriers that belong together being joined, and the card carriers subsequently being folded, together with the cards, and inserted into envelopes with any supplements desired. Here, too, several cards may be applied to one card carrier.

The above-described addition of supplements is optional.

The disadvantage of the above-described systems known in the prior art is that they work with prepared card carriers (off-line systems) that must be pre-sorted in the same order as the plastic cards and must be provided to the card shipment system. With on-line systems, the disadvantage is that they only operate with pre-fabricated card-carrier blanks which, in turn, have to be provided to the system in accordance with the sequence of the plastic cards. In other words it is necessary here, too, e.g. when processing plastic cards by different issuers, to sort the card-carrier blanks associated with the different issuers in accordance with the sequence of the plastic cards positioned.

This leads to a low level of flexibility for the entire system and to a very high susceptibility to errors, since as little as one single error, or defect, upsets the sequence, which leads to misapplications or to a removal of a card and carrier from the system. In addition, such conventional systems are very time-consuming and costly, since great care must be taken when inserting the card carriers or providing them to the system. In addition visual control is indispensable after applying the cards onto the card carrier, so as to ensure that the cards of an issuer are actually shipped on the card-carrier blanks associated with that issuer.

In summary it may be stated that the disadvantage of the card shipment systems employed today is that they are unreliable, very time-consuming and thus also very expensive, in particular for shipments of small or minimal amounts. Even though small and minimal amounts have been mentioned above, it shall be pointed out that similar problems also arise with large amounts.

Due to the above-mentioned problems, the realization of conventional card shipment systems entails a reduction of the processing performance as compared with the performance which is possible in theory and is achievable if no errors occur.

SUMMARY OF THE INVENTION

Starting from this prior art, it is the object of the present invention to provide an improved method and an improved apparatus for providing card carriers for a combination with cards, the method and apparatus exhibiting improved flexibility in processing card-carrier blanks, avoiding the errors occurring in the prior art, and thus leading to an increase in the processing performance and processing reliability.

In accordance with a first aspect, the present invention provides a method of providing a card carrier for bringing together with a card, the method having the following steps: (a) providing the card; (b) acquiring card data from the card; (c) based on the card data, providing a card-carrier blank having a first identification mark; (d) based on the card data, printing pre-determined data and a second identification mark associated with the predetermined data onto the card-carrier blank so as to form the card carrier; (e) acquiring the first identification mark and the second identification mark from the card carrier; (f) based on the first identification mark and on the second identification mark, determining whether the data printed and the card-carrier blank belong together; and (g) if it is determined that the data and the card-carrier blank belong together, providing the card carrier for bringing it together with the card.

In accordance with a second aspect, the present invention provides an apparatus for providing a card carrier for bringing it together with a card, having a card hopper for holding a card or a plurality of cards; a reader for reading card data from a card; a card-carrier blank feeder providing a card-carrier blank with a first identification mark; a printer operatively connected to the card-carrier blank feeder to receive a card-carrier blank from same and to provide the card-carrier blank with predetermined data and a second identification mark associated with the predetermined data, so as to produce the card carrier; a second reader for reading the first identification mark and the second identification mark from the card carrier; and a processor adapted to receive the card data from the first reader and to control the card-carrier blank feeder, based on the card data, to provide a predetermined card-carrier blank, to receive the first identification mark and the second identification mark from the second reader, to determine whether the data printed onto the card-carrier blank, and the card-carrier blank belong together, and to control the second reader to provide the card carrier for bringing it together with the card, if the data and the card-carrier blank belong together.

The advantage of the present invention is that is enables, due to an increase in the processing performance, the processing reliability and the processing flexibility, the matching card-carrier blank to be selected by the card shipment system itself, on the basis of the card data read from the cards. In comparison with the conventional systems this affords the benefit that a reduction of the servicing outlay is possible since the requirements placed upon the application of the card-carrier blank to the system are reduced with regard to the sequence and type of blanks. In addition, the visual check is dispensed with, since prior to providing the card carrier to the applicator, another verification is performed as to whether the printed text and the card-carrier blank actually belong together. Another advantage is to be seen in the fact that the association of form and print, and, in a further processing step, also of the card, is automatically ensured. In addition, the inventive approach ensures that the starting product, i.e. the carrier with information, and the card are a 100% match at the end of the process.

The inventive apparatus and the inventive method process the card data and the identification marks, the card data or identification marks possibly being known per se, such as being, e.g., an identification number read from the card, by means of which the database is accessed and which is also found on the card-carrier blank, and is printed onto the card-carrier blank as a print identification (second identification mark) during printing of the text.

Alternatively, other data may also be acquired as card data from the card, e.g. the customer's account number or customer data, it being possible that the acquisition includes reading out a memory element of the card, or includes an OCR read of the card.

If it is not desired, e.g. for security reasons, to utilize the identification number of the card in clear text, the marks required may also be provided in an encrypted manner, e.g. as a bar code on the card-carrier blank and the card carrier. If it is not desired to apply the identification mark of the card carrier, in clear text or in an encrypted fashion, to the card-carrier blank and the card carrier, e.g. for security considerations, provision may be made, for example utilizing the approaches having been described in the documents mentioned at the outset, for selecting, via the database, instead of the card data, a respective mark which is found on the card-carrier blank and the card carrier but which allows no unambiguous conclusion as to the card data. For example, print job numbers may be provided by means of the printer, the numbers being selected in the processing unit upon receiving the card data. In addition, an unambiguous mark may be selected via the processor on the basis of the received card data of the card, by means of which mark a card-carrier blank may be identified, this unambiguously selected coding also not allowing any conclusion as to the card data of the card.

In accordance with a first preferred embodiment of the present invention, the inventive apparatus and the inventive method operate such that a plurality of card-carrier blanks are initially provided, e.g. in a card-carrier blank hopper holding the plurality of card-carrier blanks. The plurality of card-carrier blanks are divided into at least one first group of card-carrier blanks of a first type and into a second group of card-carrier blanks of a second type, each card-carrier blank including a first identification mark in accordance with its type. On the basis of the card data read from the card, a card-carrier blank is selected, for example under the control of the processing unit, from the hopper and is provided.

In a further embodiment, the inventive method and the inventive apparatus operate such that the card-carrier blank feeder comprises a supply of unprinted sheets provided to a printer. The printer receives, from the processor, the data selected by means of the card data, for producing a card-carrier blank as well as an identification mark associated with this blank. The card-carrier blanks thus produced are subsequently provided for further processing.

In accordance with a further embodiment, provision may be made that, once the card-carrier blanks have been provided, the first identification mark thereof is acquired so as to verify, after the provision, on the basis of the card data and the first identification mark, whether the card-carrier blank provided and the cards belong together. The advantage of this approach is that erroneously selected card-carrier blanks may be discarded from the system early, so that there is still time for the system to react to this on a suitable scale, e.g. by producing or providing a correct card-carrier blank and simultaneously holding back the card to be applied.

In accordance with a further preferred embodiment of the present invention, the inventive system additionally includes an applicator which ascertains, once the card has been provided, on the basis of the card data and the second identification mark, whether the card and the card carrier belong together. If a determination is made that the card and the card carrier belong together, they are brought together and joined. Subsequently, it may be provided to fold the card carrier or to associate supplements with the card carrier or to insert the card carrier into an envelope. Alternatively, provision may be made to associate supplements with the card carrier or to fold and seal the card carrier so as to finish off the product ready for shipment.

Preferably, the card is a plastic card (e.g. CR-80) as is employed today e.g. with credit cards or the like. However, the present invention is not limited to such plastic cards. In fact, any cards desired may be handled, with "cards" not only meaning plastic cards for the purpose of the present invention, but also including other cards or card-like elements or data carriers, e.g. mini-discs or mini-CDs, SIMM cards, etc.

BRIEF DESCRIPTION OF THE DRAWINGS

Preferred embodiments of the present application will be explained below in more detail with reference to the accompanying figures, wherein.

DESCRIPTION OF PREFERRED EMBODIMENTS

Preferred embodiments will be explained in more detail with regard to the following figures, with elements which are similar or act in a similar manner being provided with similar or identical reference numerals in the figures.

Figure 1:
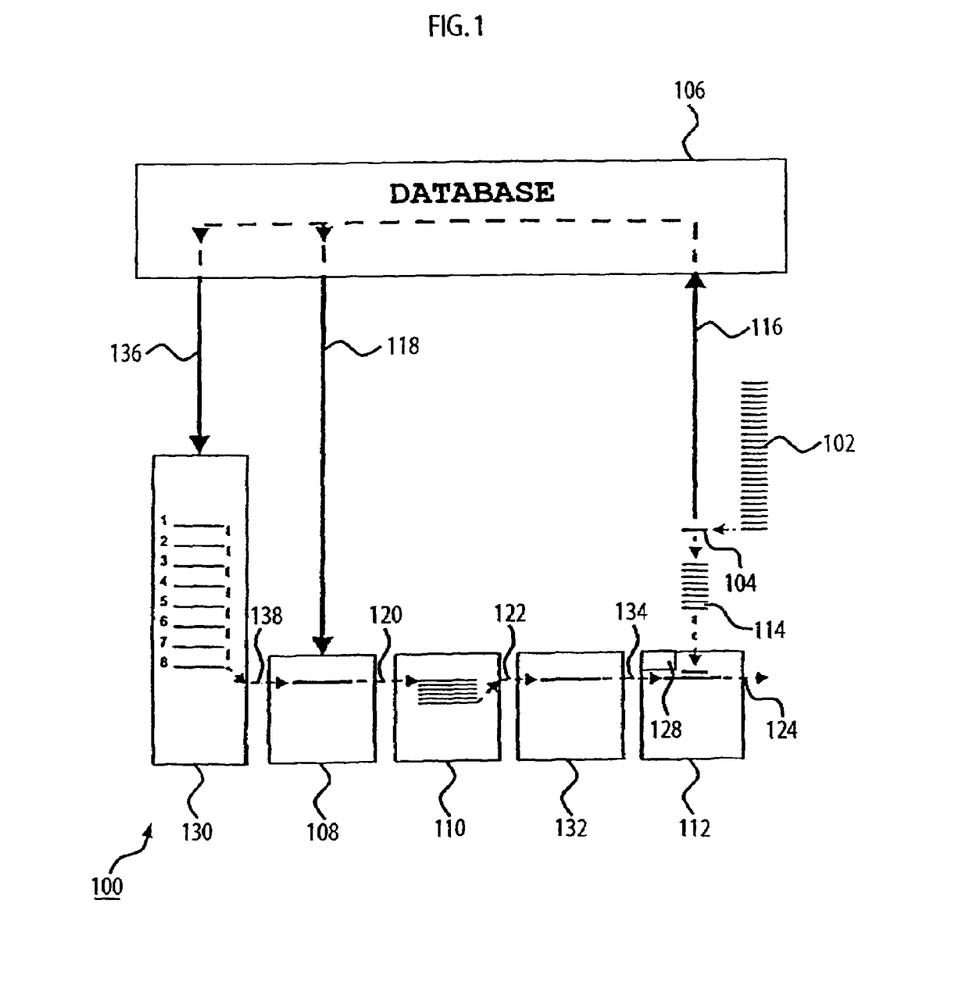
FIG. 1 is a diagrammatic representation of the inventive apparatus in accordance with a first preferred embodiment.

FIG. 1 is a diagrammatic representation of a first preferred embodiment of the inventive system 100. Like the conventional system, the inventive system includes a card-carrier hopper 102 containing a plastic card or a plurality of plastic cards. The plastic cards may be provided in any sequence in the hopper. In addition, a reader 104 is provided which reads card data from a plastic card received from the hopper 102. The card data is stored in a memory element of the plastic card, e.g. in a magnetic strip or in a chip, and includes, e.g., a customer's account number, an identification number or general customer data. Instead of cards with memory elements, cards without such memory elements may also be provided, in this case the card data being applied in clear text or in an encrypted manner onto the cards and are acquired, for example, by an OCR read. Also with cards having memory elements, card data on the card may additionally or alternatively be accessed by an OCR read. The system further includes a processor 106, a printer 108, a card-carrier buffer 110, an applicator 112, and a plastic-card buffer 114.

The card data acquired by the reader 104 are provided to the data-processor 106, as is indicated by arrow 116. A database arranged in the data-processor 106 is accessed by means of the card data, the database supplying a printer 108 with print data required for producing the card carrier, e.g. address and letter, as is indicated by arrow 118. The printer prints the data provided and a first identification mark onto the card-carrier blanks and outputs same to the card-carrier buffer 110, as is shown at 120. The card-carrier buffer 110 provides the buffered card carriers at an output, as is shown at 122.

The applicator 112 is provided to join the card carriers received from card-carrier buffer 110, and the plastic cards received from plastic cards buffer 114, and to provide them for further processing, such as adding supplements, inserting into envelopes, or any other post-processing, as is indicated by arrow 124. For this purpose, the applicator 112 includes a further reader 128 which is schematically outlined in FIG. 1 and reads the first identification mark read from the card carrier and associated with the data printed on the card-carrier blank. For this purpose, the applicator is connected with the data-processor 106 so as to determine, on the basis of the identification mark read and of the card data, whether or not the plastic card and the card carrier which are to be joined will actually be joined. If a match is established, the plastic card is attached to the card carrier and supplied to further processing. If no match is established, no joining is performed, and the plastic card and the card carrier are discarded from the system.

In a preferred embodiment of the system, the applicator may be implemented without reader. In this embodiment, the card data in the system, which has been read from the plastic card, is moved through the system together with the plastic card, so that the associated card data thereof arrives at the applicator together with the plastic card. Likewise, the identification mark of the card carrier, which has been read in the reader 132, is sent through the system along with the card carrier, so that the card carrier arrives at the applicator along with its associated identification mark. The card data obtained and the identification mark are then compared, i.e. a determination is made, on the basis of the card data and the identification mark, as to whether the card and the carrier belong together, and, depending on the result of the comparison, the carrier and the card are joined or not.

In the embodiment of the inventive apparatus shown in FIG. 1, a hopper 130 is additionally provided which contains a plurality of card-carrier blanks, the hopper containing eight groups of card-carrier blanks of different types. The differences with regard to the types may be found, for example, in the fact that the shipment system 100 processes plastic cards of different issuers, which will be true especially for smaller amounts. Alternatively, the card-carrier blanks may also be card-carrier blanks of one issuer who wants to use different blanks for different cards. However, to identify the respective card-carrier blanks of a type, they are provided with respective identification marks by means of which a card-carrier blank may be selected from the hopper.

The system further includes a reader 132 located between the card-carrier buffer 110 and the applicator 112, wherein the identification mark associated with the card-carrier blank, and the identification mark associated with the data and printed by printing the data on it is read and compared to establish whether the card-carrier blank has the correct data printed on it or whether the blank matches the data printed on it. If a match is established, the card carrier, i.e. the card-carrier blank provided with the data, is output to the applicator 112, as is indicated by arrow 134. Otherwise, the card carrier is discarded from system 100.

As was already mentioned above, in the data-processor 106, the database is accessed by means of the card data read from the plastic cards, the inventive method and the inventive apparatus, however, providing, in addition to the print data for producing the card-carrier text, a signal for selecting a card-carrier blank from hopper 130, which is then provided to hopper 130, as is indicated by arrow 136. Depending on the implementation of hopper 130, provision may be made for a respective compartment being stored in the hopper in the database for a plastic card, and the respective compartment selection identification is then provided to hopper 130. Alternatively, however, it is also possible to read out a suitable selection mark from the database and apply it to hopper 130, which, e.g. when same is charged with the different card-carrier blanks, acquires the identification marks associated with the respective card-carrier blanks so as to select a respective blank from the hopper 130 upon receiving a respective selection mark from the data-processor 106.

A selected card-carrier blank is provided to printer 108 by hopper 130 for producing the card carrier by imprinting it with the likewise provided print data, as is indicated by arrow 138.

The mode of operation of the apparatus shown in FIG. 1 is such that a plastic card is initially received in reader 104 from hopper 102 and that there, card data associated with the plastic card are read out from the card or from the memory unit, e.g. magnetic strip or chip thereof, and are supplied to the data-processor 106. On the basis of the data received, e.g. an identification number, the data-processor 106 causes, on the one hand, a respective card-carrier blank to be taken out of the card-carrier blank hopper 130, and causes the printer 110 to be controlled to prepare the card-carrier blank selected accordingly. On the basis of this data, the card carrier is then produced in the printer 108 by printing the data provided onto the selected card-carrier blank. In the reader 132 a comparison is performed of the identification number of the card-carrier blank with an identification number associated with the data printed. If this comparison is successful, i.e. if the blank and the data match, the card carrier is supplied to the applicator 112, where the identification number of the plastic card as well as the identification number of the card carrier, either the identification number of the blank or the identification number associated with the data, are again compared in the above-described manner to join plastic card and card carrier in the event of a match.

Figure 2:
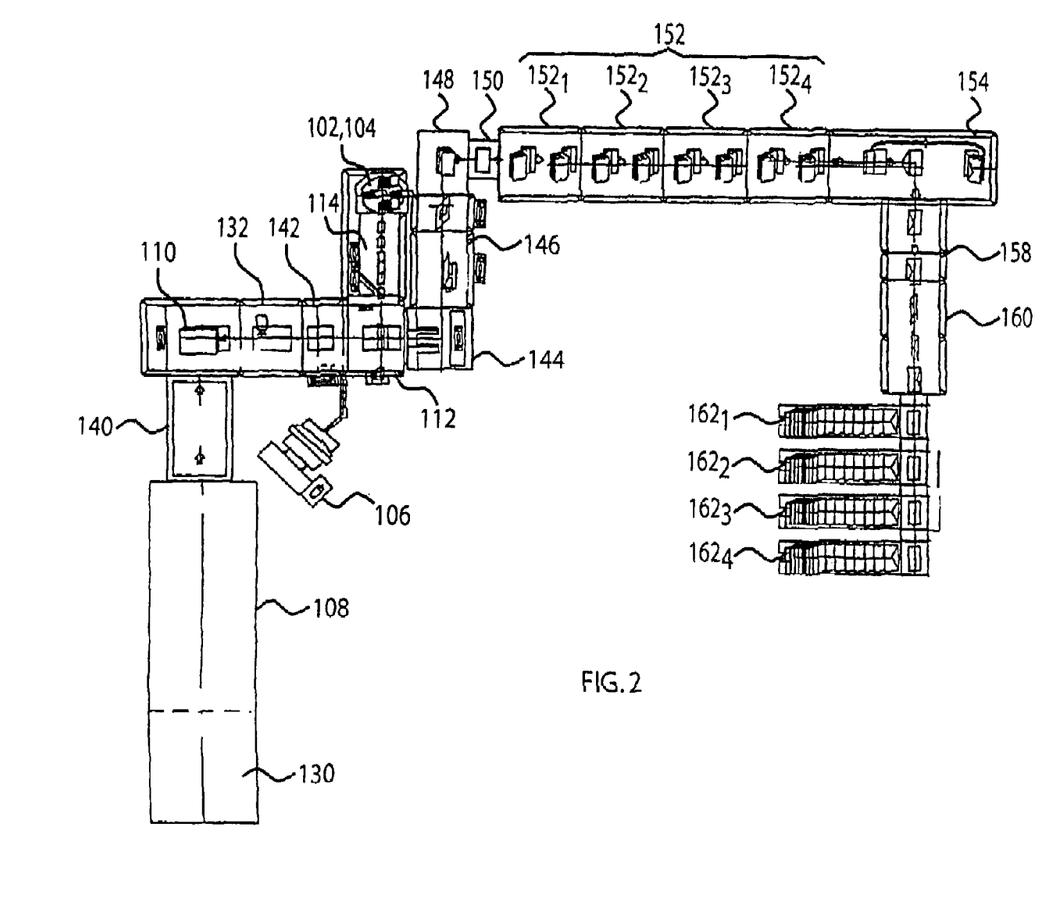
FIG. 2 is an embodiment of the inventive apparatus.

FIG. 2 is a preferred embodiment of the inventive apparatus, i.e. a shipment system for plastic cards finishing off the applied plastic cards for shipment. Elements that have already been described with reference to FIG. 1 have been given the same reference numeral in FIG. 2.

As may be seen, printer 108 is provided here, which at the same time contains the blank hopper in a section. Via a hand-over station 140, the card carriers produced by printer 108 are supplied to card-carrier buffer 110. From there, the card carriers are provided to reader 132, which performs the above-described comparison of data identification marks and blank identification marks. Via a hand-over station 142, the card carriers verified are provided to applicator 112. The applicator is further provided with the plastic card or the plurality of plastic cards provided for application, via buffer 114, from the combined hopper/reader 102, 104. The card data and the identification marks are read, prior to application, in the applicator 112 in the above-described manner. Via a redirector 144, the card carrier having the plastic card or the plurality of plastic cards applied thereto is supplied to a folder 146, and the card carriers folded are stored in a buffer 148. Via a hand-over unit 150, the card carriers which have been folded and stored in buffer 148 are supplied to a supplement feeder 152, which, in the embodiment represented, includes four stations $152_1$ to $152_4$, wherein two supplements, respectively, may be associated with the card carrier provided. Of course, the card carrier may also pass through the supplement feeder 152 so as to receive a supplement at specific stations only or to receive no supplements at all. The supplement feeder supplies the folded card carrier with the supplements, if any, to an inserter 154, and the card carrier for the supplements, if any, is introduced into an envelope. Via a hand-over station 158, the envelopes are supplied to a reversing station 160, where the envelopes are reversed. From the reversing station 160, the envelopes are output to a plurality of trays $162_1$ to $162_4$.

As an alternative to the above-described inserter 154, provision may also be made for sealing the folded card carrier on the sides and subsequently imprinting it with the address information required, as far as it has not already been applied in printer 108, so as to finish off, by this very step, the unit ready for shipment. In a further embodiment, provision may be made for merely sealing the card carrier and providing same to a tray.

Figure 3:
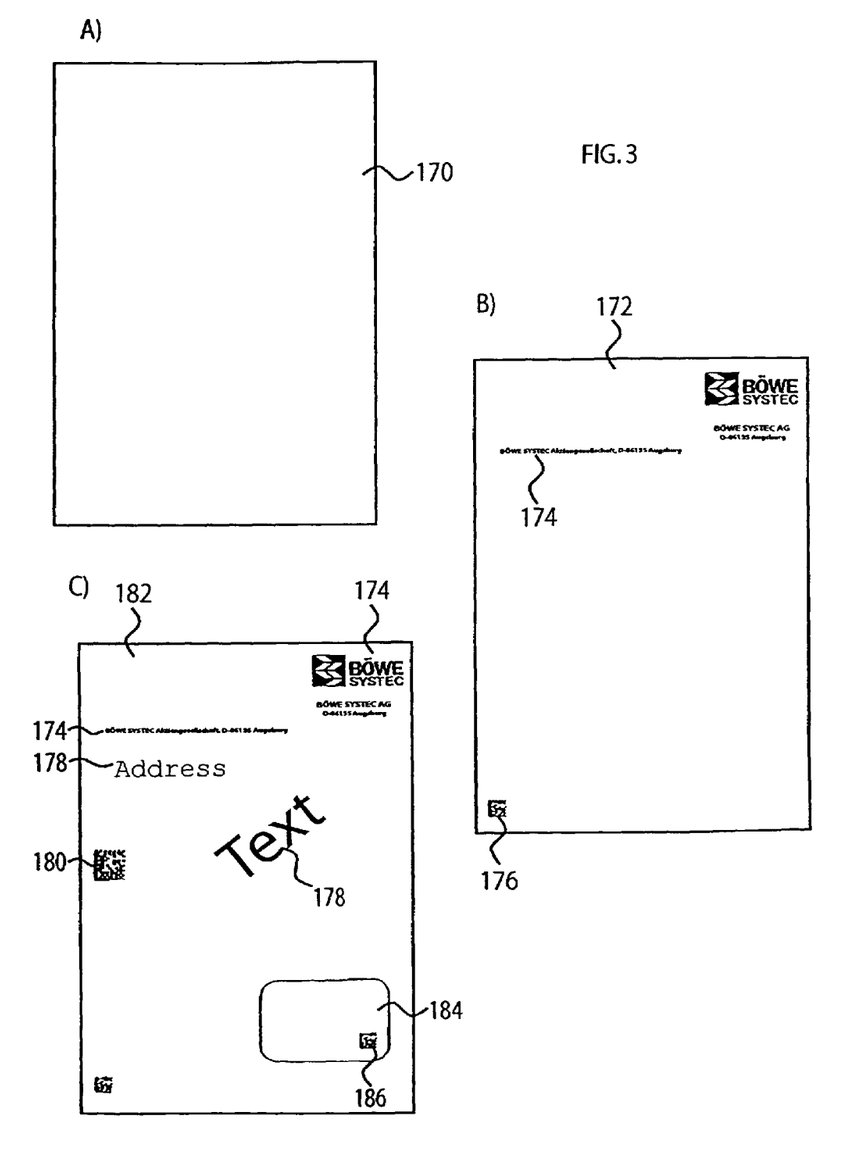
FIGS. 3A to C are representations of card-carrier blanks produced and provided by a feeder in accordance with a second preferred embodiment of the present invention.

A further, alternative embodiment of the inventive method and apparatus will be explained below with reference to FIG. 3 and with regard to a card carrier. The structure of the apparatus substantially corresponds to that of FIG. 1, instead of hopper 130, however, a supply being provided in which are provided a plurality of unprinted sheets, as is shown in FIG. 3A at 170. Under the control of the data received from the database, sheet 170 is provided with information about the issuer of the plastic card, e.g. the issuer's letterhead, as well as with a respective information mark, and is supplied as is shown in FIG. 3B. Here, the finished card-carrier blank 172, e.g. a letterhead, is shown which comprises an identification mark 176 identifying the card-carrier blank, in addition to the information 174 identifying, e.g., the issuer of the card. The card-carrier blank 172 thus provided is supplied to the system for further processing. FIG. 3C shows the card carrier and the plastic card fixed thereon after said card has been applied at the output of applicator 112. The card-carrier blank 172 supplied to the system has been provided, in printer 108, with the data for the plastic-card receiver in the above-described manner, the data being designated by 178 in FIG. 3C and including, for example, an address of the plastic-card receiver as well as a corresponding letter. In the course of preparing the letter, a second identification mark 180 associated with the printed data 178 has been printed in the printer 108. Hereby, the card carrier 182 was prepared by printing the data 178 and the identification mark 180 onto the card-carrier blank 172. In the reader 132, a comparison of the identification marks 176 and 180 was performed in the above-described manner to ascertain whether the card-carrier blank 172 and data 178 printed thereon would match. Once it had been ascertained that they would match, the plastic card 184 was fixed to the card carrier 182 in the applicator 112, the plastic card 184 storing, e.g. in its magnetic strip or chip element, the mark/data 186 outlined diagrammatically in FIG. 3C. In the above-described manner, either the identification mark 180 and the identification mark 186 or the identification mark 176 and the mark/data 186 of the plastic card were prepared prior to joining the plastic card 184 with the card carrier 182, and after a successful comparison, the plastic card 184 was affixed to the card carrier 182.

Unlike the embodiment just described, in the embodiment shown in FIG. 1 the card-carrier blank 172 would already be stored in one of the compartments within hopper 130, with the corresponding identification mark 176, and the further steps described above would be executed in the same manner.

The advantage of the above-described inventive method is that in the embodiment shown in FIG. 1, various types of cards may be arranged in any sequence desired in the card hopper 130. Each type of card has associated therewith, in the above-described manner, a respective card carrier by means of a selection from hopper 130 and printing on same in printer 108. The card-carrier blanks additionally include an identification number, e.g. a blank-form identification number.

By reading each card, the database causes a corresponding card-carrier blank to be polled, and prepares printing of same. After printing, the above-described reading comparison is effected in order to ascertain whether the form and print belong together, and subsequently another verification is performed as to whether card and carrier belong together.

By this procedure, it is ensured that
form-print card(s)
are automatically checked for whether they belong together or not, and that, in the event of an error, the card carrier or the card(s) may be discarded.

The limitations to the systems known in the prior art, which have been described in more detail in the introduction to the description, are thus eliminated in an advantageous manner by the inventive method and apparatus.

In the above description, a comparison of the card data of the card, and the identification mark has been described. This comparison is preferably effected in the processing unit and includes, on the basis of the card data and the identification marks, the determination as to whether the card contemplated and the card carrier are associated with each other, i.e. whether or not they belong together.

The above-described first and second identification marks may be identical or different, as far as a corresponding association of same with one other and with the card data is possible.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method of providing a card carrier for bringing together with a card, the method comprising:
    (a) providing the card;
    (b) acquiring card data from the card;
    (c) based on the card data, providing a card-carrier blank having a first identification mark;
    (d) based on the card data, printing predetermined data and a second identification mark associated with the predetermined data onto the card-carrier blank so as to form the card carrier;
    (e) acquiring the first identification mark and the second identification mark from the card carrier;
    (f) based on the first identification mark and on the second identification mark, determining whether the data printed and the card-carrier blank belong together; and
    (g) if it is determined that the data and the card-carrier blank belong together, providing the card carrier for bringing it together with the card.

2. The method as claimed in claim 1, wherein step (c) comprises:
    (c.1.) providing a plurality of card-carrier blanks, the plurality of card-carrier blanks comprising at least a first group of card-carrier blanks of a first type and a second group of card-carrier blanks of a second type, each card-carrier blank having a first identification mark corresponding to its type;
    (c.2.) based on the card data, selecting a card-carrier blank from the plurality of card-carrier blanks; and
    (c.3.) providing the card-carrier blank selected.

3. The method as claimed in claim 1, wherein step (c) comprises:
    (c.1.) providing an unprinted sheet;
    (c.2.) based on the card data, printing pre-determined data and the first identification mark onto the sheet so as to produce the card-carrier blank; and
    (c.3.) providing the card-carrier blank produced.

4. The method as claimed in claim 1, wherein steps (c) and (d) include reading out a database on the basis of the card data to select the card-carrier blank and data.

5. The method as claimed in claim 1, comprising, after step (c) and prior to step (d):
   acquiring the first identification mark from the card-carrier blank provided; and
   based on the card data and the first identification mark, determining whether the card-carrier blank provided and the card belong together.

6. The method as claimed in claim 1, comprising, after step (g):
   on the basis of the card data and the first identification mark or the second identification mark, determining whether the card and the card carrier belong together; and
   if the card carrier and the card belong together, joining the card and the card carrier.

7. The method as claimed in claim 1, comprising, after step (g):
   on the basis of the card data and the first identification mark and the second identification mark, determining whether the card and the card carrier belong together; and
   if the card carrier and the card belong together, joining the card and the card carrier.

8. The method as claimed in claim 1, wherein a plurality of cards are provided, the cards being read successively in step (b), the cards being buffered after step (b), and the card carriers produced for the plurality of cards being buffered after step (d).

9. The method as claimed in claim 1, wherein the predetermined data includes information about a card receiver or information about a card issuer.

10. The method as claimed in claim 7, comprising, after joining the card and the card carrier:
    folding the card carrier, or
    associating supplements with the card carrier, or
    inserting the card carrier into an envelope.

11. The method as claimed in claim 7, comprising, after joining the card and the card carrier:
    associating supplements with the card carrier, or
    folding or sealing the card carrier.

12. The method as claimed in claim 7, wherein a card carrier has a plurality of cards associated with it which are joined with it.

13. An apparatus for providing a card carrier for bringing it together with a card, comprising
    a card hopper for holding a card or a plurality of cards;
    a reader for reading card data from a card;
    a card-carrier blank feeder providing a card-carrier blank with a first identification mark;
    a printer operatively connected to the card-carrier blank feeder to receive a card-carrier blank therefrom and to provide the card-carrier blank with predetermined data and a second identification mark associated with the predetermined data, so as to produce the card carrier;
    a second reader for reading the first identification mark and the second identification mark from the card carrier; and
    a processor adapted to receive the card data from the first reader and to control the card-carrier blank feeder, based on the card data, to provide a predetermined card-carrier blank, to receive the first identification mark and the second identification mark from the second reader, to determine whether the data printed onto the card-carrier blank, and the card-carrier blank belong together, and to control the second reader to provide the card carrier for bringing it together with the card, if the data and the card-carrier blank belong together.

14. The apparatus as claimed in claim 13, wherein the card-carrier blank feeder comprises:
    a card-carrier blank hopper to contain a plurality of card-carrier blanks of different types, each card-carrier blank having a first identification mark corresponding to its type; and
    a feeder to provide a card-carrier blank selected from the hopper under the control of the processor.

15. The apparatus as claimed in claim 13, wherein the card-carrier blank feeder comprises:
    a printer adapted to receive an unprinted sheet and to print predetermined data and the first identification mark onto that sheet under the control of the processor, so as to produce the card-carrier blank; and
    a feeder for providing the card-carrier blank produced.

16. The apparatus as claimed in claim 13, wherein the processor includes a database from which data may be read, based on the card data, so as to select the card-carrier blank and data.

17. The apparatus as claimed in claim 13, having a third reader arranged in a sheet path between the card-carrier blank feeder and the printer so as to read the first identification mark from the card-carrier blank provided,
    the processor being adapted to determine, on the basis of the card data and the first identification mark, whether the card-carrier blank provided and the card belong together.

18. The apparatus as claimed in claim 13, having an applicator which brings together and joins the card and the card carrier if the applicator determines that the second identification mark read by a further reader in the applicator matches the card data.

19. The apparatus as claimed in claim 13, having an applicator which brings together and joins the card and the card carrier if the applicator determines that the second identification mark matches the card data, the applicator receiving the card data along with the card, and the applicator receiving the second identification mark along with the card carrier.

20. The apparatus as claimed in claim 18, wherein the applicator joins a plurality of cards with a card carrier.

21. The apparatus as claimed in claim 13, having a first buffer for receiving the cards read by the first reader, and having a second buffer for receiving the card carriers produced by the printer.

22. The apparatus as claimed in claim 13, wherein the predetermined data include information about the card receiver or information about a card issuer.

23. The apparatus as claimed in claim 18, comprising
    a folder, at least one supplement feeder or an inserter, which are arranged in a sheet conveying direction downstream of the applicator,
    the folder folding the card carrier, the at least one supplement feeder associating a supplement with the card carrier, and the inserter inserting the card carrier into an envelope, or
    the at least one supplement feeder associating a supplement with the card carrier, or the folder folding or sealing the card carrier.

* * * * *